(12) United States Patent
Buddendick et al.

(10) Patent No.: US 11,391,818 B2
(45) Date of Patent: Jul. 19, 2022

(54) SYSTEM FOR USING FMCW AND CW TO DETECT A MOVING OBJECT

(71) Applicant: Robert Bosch GmbH, Stuttgart (DE)

(72) Inventors: Hermann Buddendick, Sindelfingen (DE); Markus Schlosser, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 16/628,370

(22) PCT Filed: May 9, 2018

(86) PCT No.: PCT/EP2018/062065
§ 371 (c)(1),
(2) Date: Jan. 3, 2020

(87) PCT Pub. No.: WO2019/007569
PCT Pub. Date: Jan. 10, 2019

(65) Prior Publication Data
US 2020/0124706 A1 Apr. 23, 2020

(30) Foreign Application Priority Data
Jul. 5, 2017 (DE) .......................... 102017211432.0

(51) Int. Cl.
*G01S 7/41* (2006.01)
*G01S 13/34* (2006.01)
(Continued)

(52) U.S. Cl.
CPC .............. *G01S 7/415* (2013.01); *G01S 13/34* (2013.01); *G01S 13/42* (2013.01); *G01S 13/584* (2013.01);
(Continued)

(58) Field of Classification Search
CPC .......... G01S 7/415; G01S 13/34; G01S 13/42; G01S 13/584; G01S 13/72; G01S 13/931;
(Continued)

(56) References Cited

U.S. PATENT DOCUMENTS 9,575,160 B1* 2/2017 Davis .................... G01S 13/931
9,599,702 B1* 3/2017 Bordes .................... G01S 13/18
(Continued)

FOREIGN PATENT DOCUMENTS

DE 102011121560 6/2013
DE 102014010225 1/2015
(Continued)

OTHER PUBLICATIONS

International Search Report for PCT/EP2018/062065, dated Aug. 6, 2018.

*Primary Examiner* — Donald H B Braswell
(74) *Attorney, Agent, or Firm* — Norton Rose Fulbright US LLP; Gerard Messina

(57) ABSTRACT

A system for detecting a moving object, having: a radar device for receiving at least one signal reflected by the object under at least one angle; and a processing unit for ascertaining at least one relative velocity and at least one angle for each ascertained relative velocity between the radar device and the object; a micro-Doppler analysis for the signals received from the object being able to be performed with the processing unit; the micro-Doppler analysis being performed based on angles determined for the received signals; and a type of the object being ascertainable with the performed micro-Doppler analysis.

13 Claims, 5 Drawing Sheets

(51) Int. Cl.
  *G01S 13/42* (2006.01)
  *G01S 13/58* (2006.01)
  *G01S 13/72* (2006.01)
  *G01S 13/931* (2020.01)

(52) U.S. Cl.
  CPC ............ *G01S 13/72* (2013.01); *G01S 13/931* (2013.01); *G01S 2013/93185* (2020.01); *G01S 2013/93271* (2020.01)

(58) Field of Classification Search
  CPC . G01S 2013/93185; G01S 2013/93271; G01S 2013/932; G01S 13/32; G01S 13/87; G01S 13/343; G08G 1/166
  See application file for complete search history.

(56) References Cited

U.S. PATENT DOCUMENTS

| | | | |
|---|---|---|---|
| 2010/0152600 A1* | 6/2010 | Droitcour | G01S 13/583 600/534 |
| 2017/0097412 A1* | 4/2017 | Liu | G01S 13/726 |
| 2017/0102457 A1* | 4/2017 | Li | G01S 7/35 |

FOREIGN PATENT DOCUMENTS

| | | |
|---|---|---|
| DE | 102015109759 | 1/2016 |
| JP | 2008532000 A | 8/2008 |
| WO | 2018010866 | 1/2018 |

\* cited by examiner

SYSTEM FOR USING FMCW AND CW TO DETECT A MOVING OBJECT

FIELD OF THE INVENTION

The present invention relates to a system for detecting a moving object. In addition, the present invention relates to a method for detecting a moving object. The invention also relates to a computer program product.

BACKGROUND INFORMATION

A radar system is set up to emit a radar signal and to compare the radar signal reflected at an object to the emitted radar signal. Numerous different play types are known by which different information can be collected about the object. One variant is the FMCW (frequency modulated continuous wave) radar in which the emitted radar signal is modulated using a sawtooth function. A distance of the object from the radar system is then able to be determined with satisfactory accuracy. An object angle which indicates in which direction from the radar sensor the object may be found is able to be achieved through the use of a plurality of antennas or through the control of one antenna in such a way that the signals are radiated in predefined directions.

A Doppler shift of the reflected versus the emitted radar signal may point to a relative velocity of the object in relation to the radar system. An object that is moving in itself such as a pedestrian, whose arms and legs swing back and forth, exhibits characteristic, often periodic fluctuations in the measurable Doppler frequencies. These fluctuations are able to be analyzed in order to allow for a more precise classification.

Patent document DE 10 2015 109 759 A1 refers to controlling a radar system on board a motor vehicle in such a way that a micro-Doppler analysis can be carried out.

For the classification of an object with the aid of a radar system that is able to move on its own, e.g., on board a motor vehicle, a complex modulation such as in the case of chirp sequences may be used. However, the processing could be very complex in such a case. For example, a two-dimensional Fourier analysis of the difference signal between the transmitted and the received signal may be required so that a powerful processing unit is indispensable.

SUMMARY OF THE INVENTION

One object on which the present invention is based is to provide a simple, radar-based technology for detecting a moving object.

According to a first aspect, the present invention provides a system for detecting a moving object, having
  a radar device for receiving at least one signal reflected by the object under at least one angle; and
  a processing unit for ascertaining at least one relative velocity and at least one angle for each ascertained relative velocity between the radar device and the object;
  a micro-Doppler analysis for the signals received from the object being able to be performed with the aid of the processing unit;
  the micro-Doppler analysis being performed based on angles determined for the received signals; and
  a type of the object being ascertainable with the aid of the performed micro-Doppler analysis.

In the provided system a micro-Doppler analysis is performed, and a type of the object is classified on this basis. A moving pedestrian has different body parts that move at different velocities relative to the radar devices so that a thereby produced velocity distribution over time may therefore be characteristic of a pedestrian. As a result, an exclusively radar-based pedestrian or bicyclist protection for a motor vehicle, for example, is able to be made available by the provided system.

According to a second aspect, the present invention provides a method for detecting a moving object, the method having the steps:
  receiving at least one signal reflected by the object under at least one angle with the aid of a radar device; and
  ascertaining at least one relative velocity between the radar device and the object;
  performing a micro-Doppler analysis for the received signals with the aid of the processing unit, the micro-Doppler analysis being performed on the basis of angles determined for the received signals; and
  ascertaining a type of the object with the aid of the performed micro-Doppler analysis.

In one specific embodiment of the system, it is provided that receiving angles for different relative velocities are ascertainable. This makes it possible to carry out an even finer micro-Doppler analysis.

In one specific embodiment of the system, the ascertainment of the angles is able to be carried out by a correlation of the received signals. In this way, a reliable ascertainment of the received signals obtained from different angles is realized.

One specific embodiment of the system provides that the ascertained angles are used for a simultaneous micro-Doppler analysis of a plurality of objects having overlapping distributions of relative velocities. Depending on the spatial direction, this makes it possible to distinguish different objects from one another. For example, multiple pedestrians are advantageously able to be distinguished from one another.

A further specific embodiment of the system is characterized in that a width of a frequency spread and a time characteristic of the frequency spread of the received signals are ascertainable with the aid of the processing unit. In this way, a classification of the moving objects is even further improved.

Another specific embodiment of the system provides that a periodicity of a spread of Doppler frequencies is ascertained with the aid of the processing unit. For example, a periodic movement of extremities of a pedestrian is able to be detected in this way.

A further, specific embodiment of the system is characterized in that a restriction of the angle estimate to a defined, small frequency/velocity range is carried out. This advantageously makes it possible to concentrate a detection power of the system to regions of interest.

One further, specific embodiment of the system is characterized in that the radar device is developed as a continuous-wave radar device. Using this type of radar device makes it possible to distinguish received signals very well.

One further, specific embodiment of the system is characterized in that it also includes a further radar device, which may be developed as an FMCW radar device. The FMCW radar device is thereby well suited for ascertaining a distance and a first relative velocity, and the continuous-wave radar may be used to good effect for a high velocity resolution of the object.

One further, specific embodiment of the system is characterized in that the radar devices have at least one transmission antenna and at least two receiving antennas in each case, and received signals from different receiving directions are able to be received with the aid of the receiving antennas. This makes it possible to carry out a reliable ascertainment of the angle under which the signals are received.

Disclosed device features similarly result from correspondingly disclosed method features, and vice versa. This particularly means that features, technical advantages and specific embodiments relating to the system for locating an object in the environment of a motor vehicle similarly result from corresponding specific embodiments, features and advantages relating to the method for locating an object in the environment of a motor vehicle, and vice versa.

In the following text, the present invention will be described in detail with further features and advantages on the basis of a plurality of figures.

DETAILED DESCRIPTION

Figure 1:
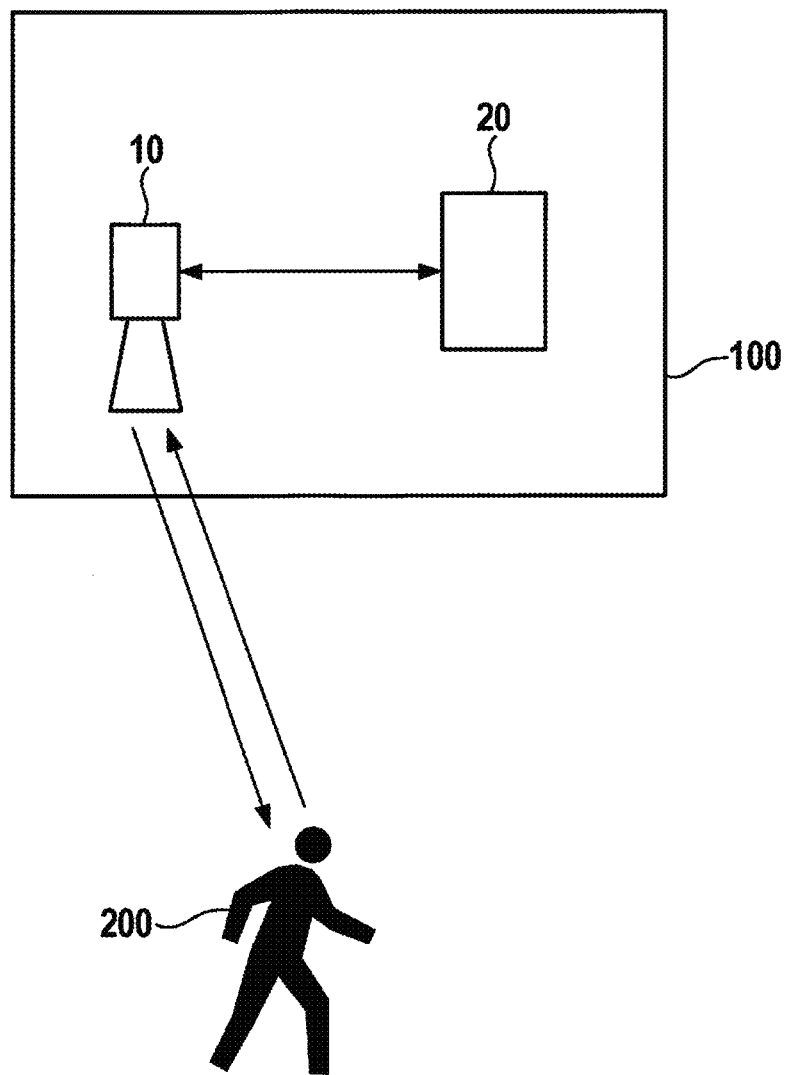
FIG. 1 shows a specific embodiment of a provided system.

The present invention is based on the idea of analyzing a spectrum of relative velocities for an object or a plurality of objects with the aid of a radar device using a micro-Doppler analysis. In this way, a precise analysis or classification of individual and/or multiple objects is/are able to be realized even in the case of complex scenarios featuring similar distances and velocities but different directions.

The system may allow a combination of the advantages of different radar devices in order to analyze both precise information about the type of movement of the object and precise information about the location and the change in location of the object. More specifically, the analysis of precise velocity information of the object may be successful even if the motor vehicle with the radar devices is moving in relation to the environment.

The classification of the object is able to be markedly improved in this way. In particular, a classification of an object as a pedestrian/bicyclist may be carried out in an improved manner so that, for example, a driver-assistance system and/or an active and/or a passive accident protection device on board the vehicle is/are able to be controlled in a more optimal manner. For example, if it is determined that the pedestrian is on a collision course with the motor vehicle, then a signal is able to be output to warn a driver or the pedestrian. In one advantageous variant, an automatic braking operation of the motor vehicle is able to be initiated with the aid of the system.

A processing unit is provided to carry out a micro-Doppler analysis of the signals received from the radar device. The micro-Doppler analysis makes it possible to determine whether a movement pattern of an object coincides with a known movement pattern of a pedestrian. Depending on the detailing of the executed micro-Doppler analysis, it may even be advantageously determined which activity the pedestrian is pursuing.

A radar device developed as a continuous-wave radar device is able to be operated in a continuous-wave operation such as over a period of approximately 15 to approximately 25 ms, for example, and in other variants of approximately 10 to approximately 15 ms or approximately 25 to approximately 30 ms. By evaluating the Doppler frequency, a precision of the velocity determination is able to be significantly increased.

In this manner, the system is easily adaptable to the requirements for detecting pedestrians; for example, at a transmission duration of the permanent-wave signal of approximately 20 ms, a velocity resolution of the object of approximately 0.1 m/s is able to be realized, which is sufficient to analyze a typical velocity of a pedestrian in greater detail. A typical velocity of a pedestrian amounts to approximately 1 m/s for the torso and up to approximately 4 m/s for a leg swinging forward, which results in approximately 10 to 40 frequency bins. In contrast, a considerable reduction of a relative velocity arises in the case of crossing pedestrians.

In the micro-Doppler analysis, a spread of the Doppler spectrum for moving objects is evaluated, in which stationary objects and moving rigid bodies that do not cause any spread in the Doppler spectrum are ignored.

With the aid of the micro-Doppler analysis, a difference signal between the emitted and the permanent-wave radar signal reflected at the object is able to be analyzed with regard to its frequency distribution. The analysis may be carried out using a Fourier transform. In the process, the signal energies in predefined frequency ranges are able to be calculated. The frequency distribution may also be analyzed in its time characteristic so that, for example, a movement pattern of a walking or running pedestrian is able to be distinguished.

In one advantageous further development of the present system, a further radar device may be provided, which could be developed according to a random measuring principle, and which may be according to the FMCW principle, which normally uses frequency ramps of a continuous radar signal. Other embodiments are also possible; for example, a radar device is able to be used in which the individual solid angles are scanned one after the other, mechanically or electronically, in an effort to determine the object angle.

Signals of individual FMCW ramps of the further radar device may be processed separately from one another. Toward this end, the FMCW ramps may be analyzed using a known, one-dimensional Fourier transform. This may require a considerably lower computational outlay than the two-dimensional Fourier analysis involving chirp sequences. To separate the different objects, the detected frequency peaks are able to be combined with one another across different ramps following the Fourier analysis. The two radar devices are ultimately able to be operated in alternation, which makes it easier to carry out the scanning operations in the same frequency range.

As an alternative, the two radar devices may also be integrated into a single radar device, the integrated radar device being sequentially operated using different signals. At one instant, for example, it may be operated either using an FMCW signal or a continuous-wave signal. In particular, the operating types may be activated in alternation. Omitting a radar device provides cost savings. A known radar device is able to be expanded to the described system with a reasonable outlay in costs and labor.

Only such frequencies that lie below a predefined limit frequency may be examined, the limit frequency being determined on the basis of the velocity of the radar devices in relation to the environment. As a result, only signal components that are allocated to objects that approach the radar device more rapidly than the radar device is moving in relation to the environment may be taken into account, that is to say, objects that move on their own relative to the environment. The Doppler frequency of these objects is correspondingly lower (or higher in its amount) than the particular Doppler frequency that corresponds to the negative ego velocity.

A basic variant of the provided system is shown in FIG. 1. A radar system 10 can be seen, which is functionally connected to a processing unit 20. With the aid of radar device 10, transmission signals are emitted, which are at least partially reflected at an object 200 (such as a pedestrian) and are received as received signals under different, very similar angles. With the aid of processing unit 20, a micro-Doppler analysis is carried out using the received signals, and a type of object 200 is classified on that basis.

The provided system may advantageously be used in a motor vehicle as a radar-based pedestrian protection. However, radar-based applications in stationary monitoring systems such as in the military field are also conceivable.

Figure 2:
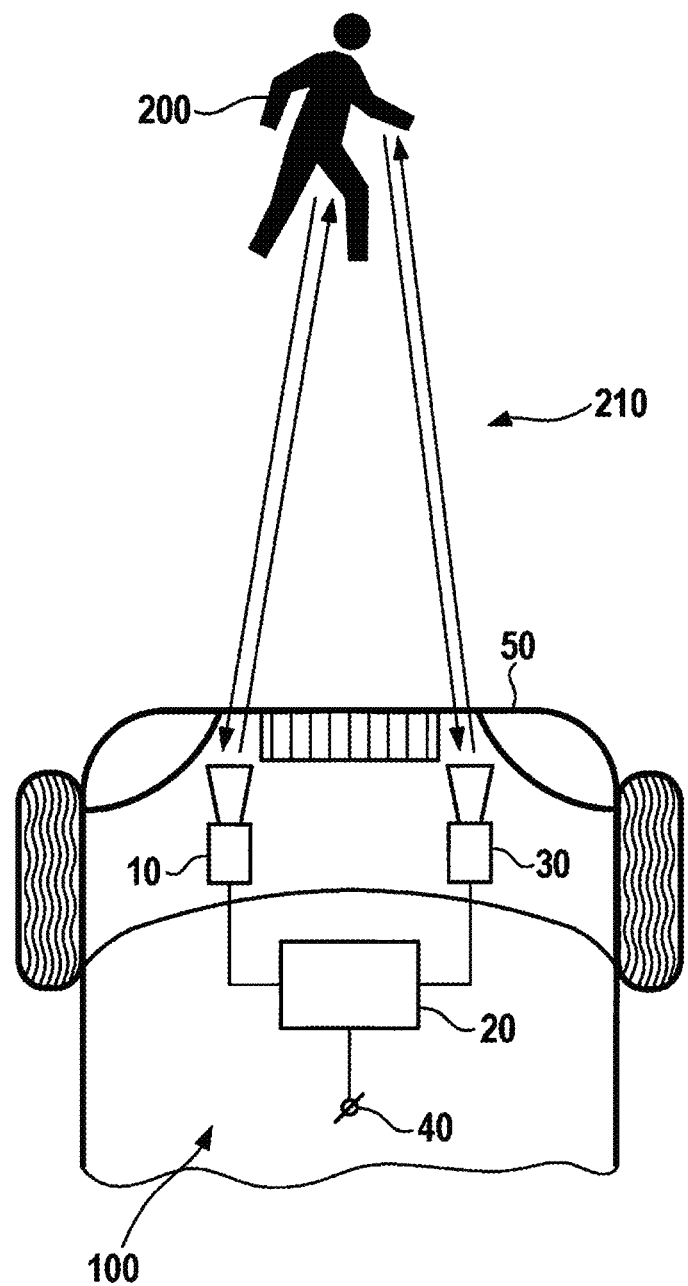
FIG. 2 shows another specific embodiment of a provided system.

FIG. 2 shows a useful exemplary application case of the aforementioned advantageous further development of provided system 100 for a motor vehicle 50, which is equipped with a radar device 10, a further radar device 30, and a processing unit 20. Each radar device 10, 30 has at least one transmission antenna and at least two, and in particular four, receiving antennas (not shown), so that receive signals from spatially different directions are able to be received using the at least two receiving antennas, which are subsequently correlated, so that it is possible to derive directional information for the received signals. The two radar devices 10, 30 may also have an integrated development in the form of a single radar device. In this case, an alternating operation as a first radar device 10 and a further radar device may be used. A moving object 200, which is represented by a pedestrian in the case of FIG. 1, is located in environment 210 of motor vehicle 50.

Using system 100, it is provided to scan object 200 by radar signals and to determine location, movement and classification information of object 200. The determined information is able to be made available for further processing with the aid of an interface 40, which may be developed as a warning and/or control device (not shown) on board motor vehicle 50.

Moving object 200 is able to move in relation to environment 210. In addition, object 200 may move in itself such as perform micromovements. In the process, parts of movable object 200 (arms and legs in the case of a pedestrian) may move at a different velocity than object 200 in relation to environment 210. In this case, not only a Doppler frequency but a whole range of Doppler frequencies is able to be measured with the aid of radar devices 10, 30.

For example, a movable object 200 in the form of a pedestrian may move relative to environment 210 at a velocity of approximately 5 km/h. Because of the periodic movement of the legs (and frequently also the arms) of the pedestrian, his or her Doppler frequency spread then likewise fluctuates in a periodic manner. If both feet are planted on the ground, the maximum velocity is given by the torso. Along the legs, this velocity drops to zero for the feet. Any Doppler frequencies that correspond to velocities between zero and the velocity of the torso are therefore potentially measurable. This is also the instant of the smallest Doppler frequency spread. When swinging forward, on the other hand, a foot reaches up to approximately three to four times the torso velocity.

With the aid of a range of Doppler frequencies or a frequency bin ascertained in this way, a correlation of received signals from all receiving antennas is able to be carried out. This makes it possible to realize what is known as a "multi-target estimator", where multiple objects situated under different angles are ascertained in a single frequency bin. In order to determine the spectrum of the velocities of object 200 with sufficient precision without requiring a complex modulation and a complex evaluation of the radar signals, it is provided to determine a distance and/or a rough movement of object 200 with the aid of first radar device 10, which uses an FMCW signal known per se. To ascertain a high velocity resolution of object 200, micromovements of object 200 are determined and analyzed in addition, with the aid of radar device 10, which may be done using a micro-Doppler analysis. Radar device 10 may use a continuous-wave signal (CW ramp) for this purpose, and thus does not modulate the emitted radar signal over time. The determination with the aid of the permanent-wave signal is able to be carried out in a defined manner for longer than a conventional ramp of the FMCW method and, for instance, lasts approximately 20 ms in order to achieve a sufficient velocity resolution for object 200.

For each frequency bin, a correlation of the received signals is able to be carried out either as a function of or independently of the power received therein. This then makes it possible to detect a power increase or a correlation between the individual received signals of the different receiving antennas, the computational outlay being higher in the latter case.

For the permanent-wave signal, only the Doppler effect has an effect on the received signal. The distance of object 200, on the other hand, is unimportant.

The difference frequency, and thus the Doppler frequency, directly corresponds to a physical velocity of object 200 in relation to motor vehicle 50. Since no distance is able to be determined for the continuous-wave signal, the separation of the scene into the individual objects 200 still has to be carried out using the classic FMCW method. However, both radar devices 10, 30 are able to determine the velocity and the angle of object 200 in relation to radar devices 10, 30 so that it is possible to uniquely allocate the micro-Doppler effect to one of detected objects 200 in most cases.

Finally, in a basic form of the provided system, the permanent-wave signal is able to be analyzed virtually completely separately from the classic FMCW ramps.

Figure 3:
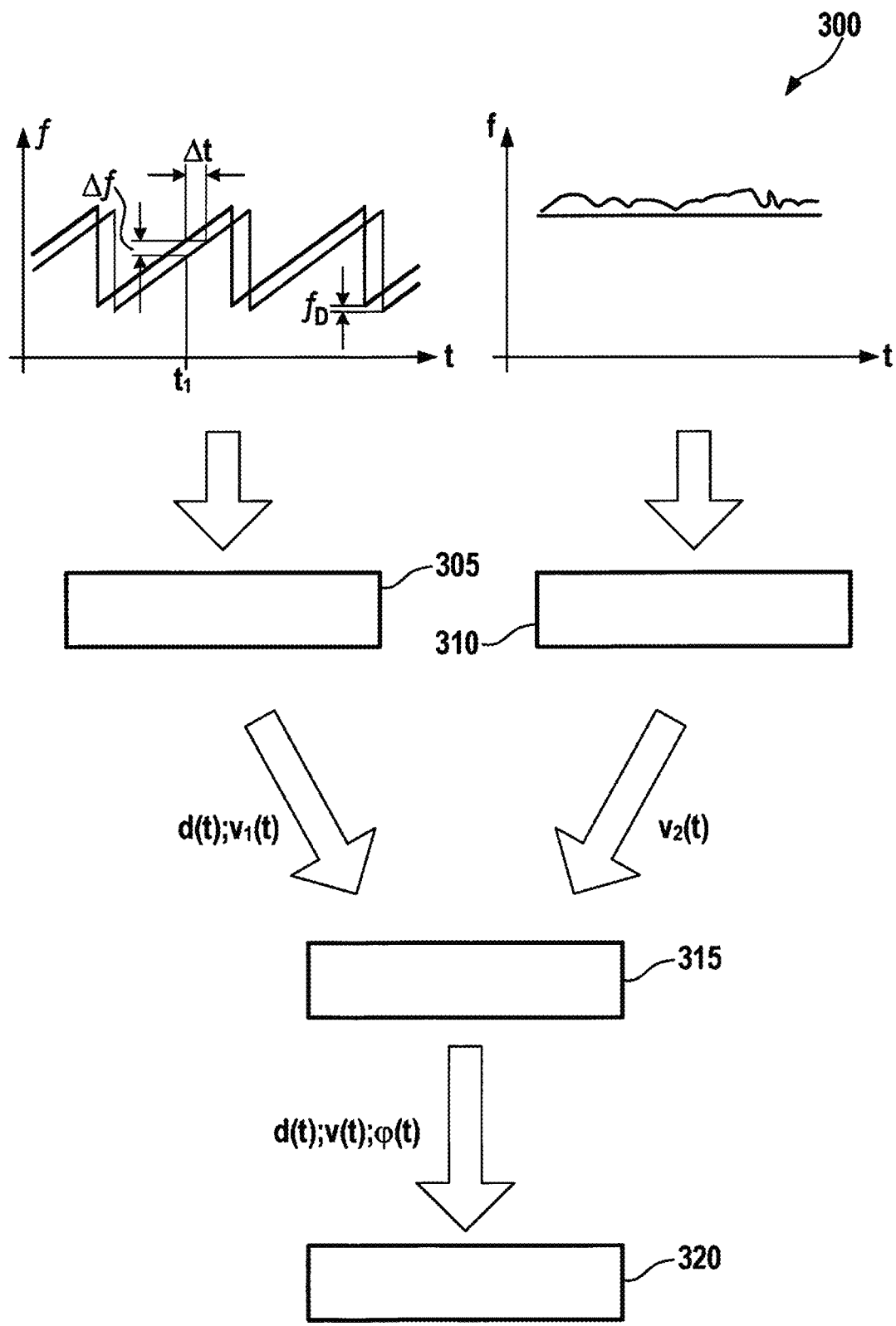
FIG. 3 shows a basic flow diagram of a provided method.

FIG. 3 shows a flow diagram 300 of a method for determining information about a movable object 200, the method also using a further radar device 30, and the information in particular including a location or a movement of object 200 and a distribution of frequencies of micromovements.

In a step 305, object 200 is scanned using further radar device 30, which may be on the basis of an FMCW signal. Alternatively, other radar methods are conceivable as well. The emitted and the reflected signal are indicated in terms of quality over step 305 in a time diagram. This determination is known in radar technology and may be carried out in a variety of known ways. A first distance d(t) to the further radar device 30 and a first relative velocity v1(t) between object 200 and further radar device 30 may be determined as the results of the scanning operation.

In a step 310, which may be carried out in alternation with step 305, object 200 is scanned with the aid of radar device 10 on the basis of a radar signal having a constant frequency (continuous-wave signal). The diagram sketched over step 310 outlines the emitted and the reflected signal. A second relative velocity v2(t) between object 200 and radar device 10 may be determined as a result of the scanning operation. The second relative velocity may be very highly resolved and thus allows for an efficient execution of a micro-Doppler analysis.

In a step 315, the items of information determined in steps 305 and 310 are allocated to one another. First items of information and second items of information that include identical angles and, furthermore, identical time developments of their angles, may relate to the same object 200 and may be allocated to one another. Step 315 may supply a distance d(t), a velocity v(t), and an angle φ(t) as a combination of the first and second items of information.

In a step 320, the frequency distribution of the second relative velocities is able to be analyzed in order to determine whether the resulting pattern points to a pedestrian.

For this purpose, a spread of the relative velocities or the Doppler frequencies representing the relative velocities is ascertained and analyzed. In the case of a broad spread, object 200 is classified as a pedestrian based on a time analysis, for which corresponding patterns or characteristics of such patterns may be predetermined and utilized for a comparison.

During the analysis of the received powers, each individual receive power of all receiving antennas may simply be added together (non-coherent integration) or else, as an alternative, it may be attempted to determine to what extent an object or multiple objects is/are able to be determined under a corresponding angle in a frequency bin with sufficient quality. It suffices if only the angle of the respective higher power object is able to be determined in each frequency bin (based on the considerable power difference of received signals) or if only an angle is to be determined in order to save the higher computational effort for a multi-target estimator.

The processing of the continuous-wave signal of radar device 10 is basically the same as the processing of FMCW ramps of the further radar device 30, for example. A non-coherent integration across all receiving channels is followed by a spectral analysis, which may be done using a fast Fourier transform. In the process, the signal is split up into frequencies of which it is composed. Next, the power of the frequency components in each frequency bin is determined, a frequency bin corresponding to a defined frequency interval of the overall spectrum in each case.

In contrast to FMCW ramps, however, no frequency peaks have to be detected here (and allocated to one another). Each frequency bin having a power above the noise threshold directly indicates the presence of a physical object 200 with the corresponding velocity (in the radial direction). For an object 200 with a micro-Doppler effect, this is of course the case for a whole frequency spectrum. The angle estimate, too, is practically the same as for FMCW ramps. Once again, only the detection of individual frequency peaks is omitted. In addition, there is only a single continuous-wave signal for which an angle is able to be determined so that the calculation of an angle per ramp is omitted as well. With an available micro-Doppler, however, the individual frequency bins take the place of the different ramps.

In the automotive field, the ego movement of radar device 10 may make it more difficult to perform a micro-Doppler analysis in order to detect a pedestrian. This is so because for a moving radar device 10, it looks as if a stationary object 200 directly ahead were moving towards it at its own velocity. At a lateral offset, this apparent velocity is reduced by the cosine of the viewing angle. At the moment of passing (i.e. at 90°), object 200 appears to become briefly stationary before it moves away from radar device 10 towards the back. The reflected power of stationary object 200 in the spectrum is therefore restricted to the particular frequencies that correspond to the velocities between zero and the negative ego velocity. The ego velocity denotes the velocity of motor vehicle 50 relative to environment 210.

Figure 4:
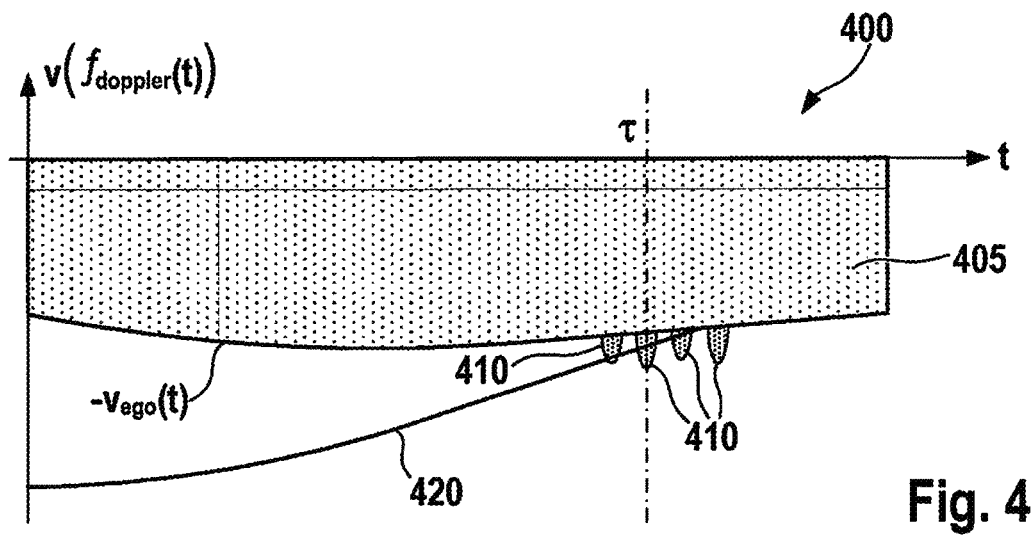
FIG. 4 shows an exemplary diagram to describe the method of functioning of an advantageous further development of the provided system.

These relationships are illustrated in FIG. 4 in a diagram 400. A time t has been plotted in the horizontal direction, and a velocity v as a function of Doppler frequency $f_{doppler}$ (t) is plotted in the vertical direction. A base signal 405 represents objects that are moving at a velocity that is lower than the negative ego velocity relative to radar device 10, and thus are to be considered stationary. Individual peaks 410 correspond to an object 200 in the form of a pedestrian. Individual peaks 410 represent maximum relative velocities that are generated by steps of the pedestrian relative to second radar device 30.

A characteristic 420 represents stopped oncoming traffic of motor vehicle 50. A cutoff line of region 405 denotes the negative ego velocity $-v_{ego}$ of motor vehicle 50.

All other frequencies outside this region are not disturbed by a stationary object. In contrast, the background clutter in the other FMCW ramps is distributed across a considerably greater frequency range.

For the protection of pedestrians or bicyclists in the driver assistance field, crossing pedestrians are of particular relevance. In contrast to pedestrians approaching from the front, the radial component of their movement in the direction of radar device 10 is indeed considerably reduced but it is not zero. Even if the pedestrian crosses a road on which motor vehicle 50 is traveling at a right angle, the pedestrian does not move at a right angle to radar device 10. Nevertheless, for a crossing pedestrian, only the relative velocity of the leg swinging towards the front is typically greater than that of a stationary object directly ahead in the driving direction.

Only the corresponding frequency components are therefore also to be spectrally analyzed without disturbance. Because of the slow but active movement of the pedestrian in the direction of radar device 10, the micro-Doppler effect to be analyzed falls into the frequency range directly below the Doppler frequency that corresponds to the negative ego velocity. An estimate of high quality for the ego velocity is usually available on board motor vehicle 50. As a result, it is possible to directly select the region in the frequency spectrum that is relevant for pedestrians.

In curves, individual points of motor vehicle 50 have different velocities on account of the rotary movement. The ego velocity of motor vehicle 50 is generally determined with regard to a vehicle rear axle. Because of a usually also known yaw rate of motor vehicle 50, it is easily possible to derive the corresponding velocity of a radar device 10 installed in front on that basis.

Because the pedestrian approaches the road from the side, the measurable velocity is also reduced by the lateral offset with respect to the movement direction of radar devices 10, 30. The pedestrian experiences the same reduction of the apparent velocity as stationary objects 200 under the same viewing angle. On the other hand, because of the larger viewing angle with the same movement direction of the pedestrian, the radial component of the actual pedestrian movement becomes greater.

Similar methods as for stationary radar systems with a constant transmission frequency are basically suitable for the actual analysis of the micro-Doppler. However, because of the overlap of a large portion of the micro-Doppler spread, it is mainly the magnitude of the micro-Doppler power, the width of the spread without overlap, the amplitude of the fluctuation of this width over time as well as the time interval/period between two maximum spreads (and thus the measured step frequency of the pedestrian) that are decisive.

Figure 5:
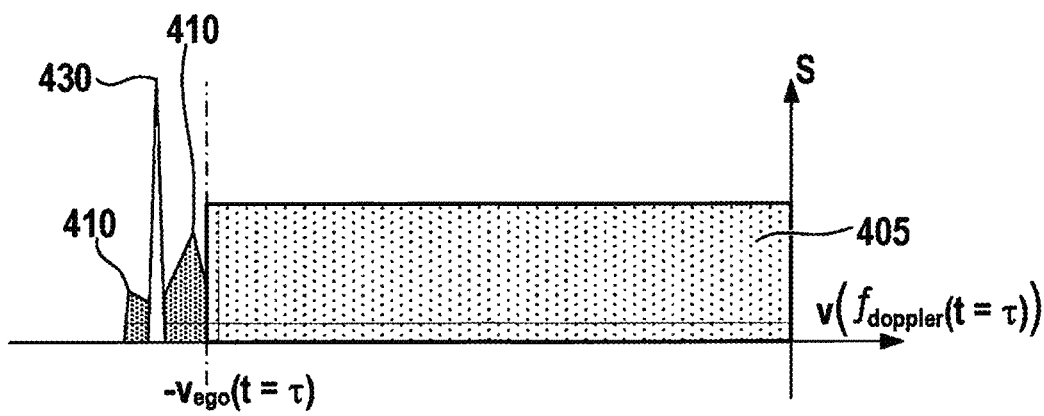
FIG. 5 shows a section through the diagram from FIG. 4.

FIG. 5 shows the diagram from FIG. 4 along a section at instant t=τ. On the left, a broad spread of the frequencies of peaks 410 of the pedestrian can be seen in the region of peaks 410. Peaks 410 are produced by a forward swinging foot of the pedestrian together with the thereby generated high relative velocities with respect to the radar device. Also visible is a peak 430, which is generated by a stopping vehicle 50, which is stopped and thus has a similarly slow relative velocity as the pedestrian. The receiving power for the chassis is greatly increased in this case because it is made of metal. This makes it easy to identify the pedestrian, and a classification of object 200 as a pedestrian is able to take place as well as subsequent processing of this information.

Figure 6:
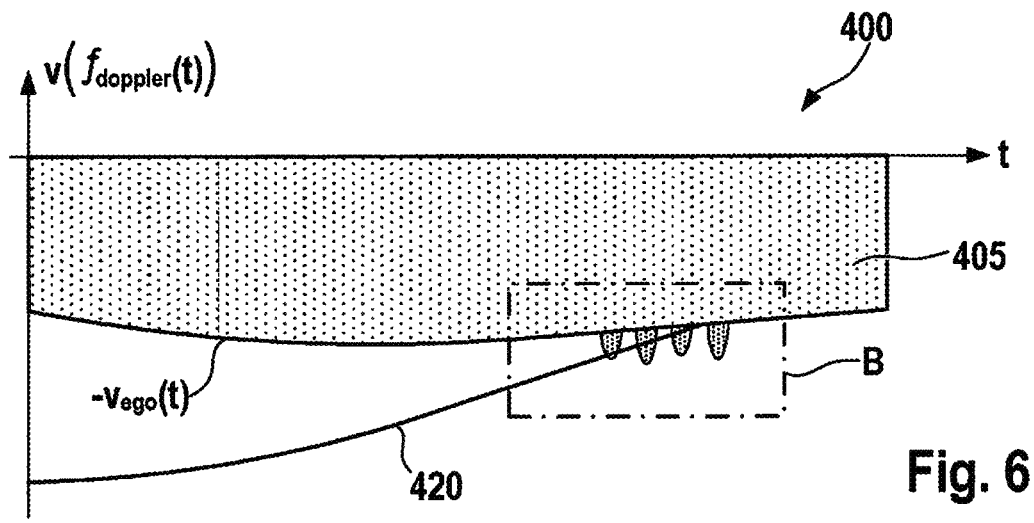
FIG. 6 shows a cutaway from the diagram of FIG. 4.

FIG. 6 shows a cutaway B from FIG. 4 for which a time-frequency rasterization is carried out.

Figure 7:
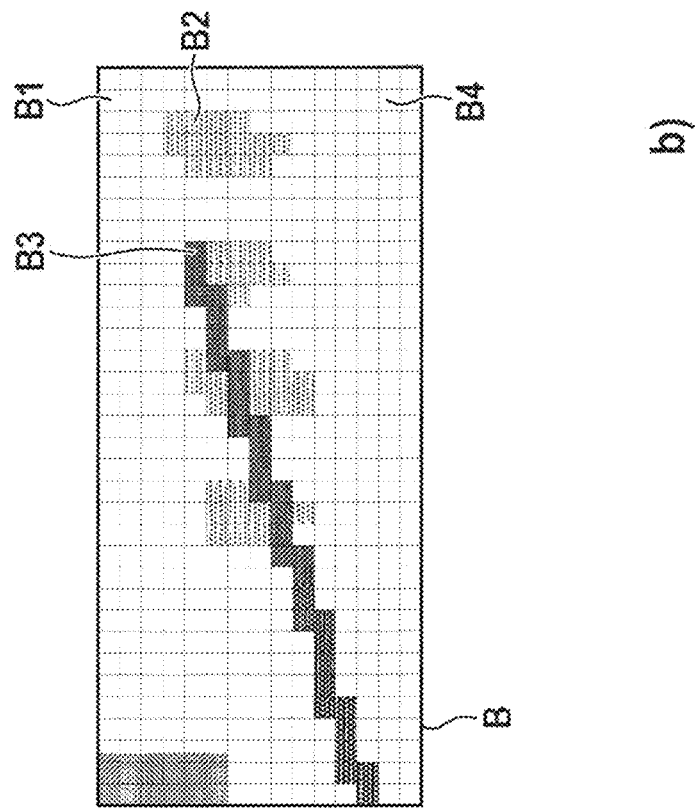
FIG. 7 shows the cutaway from FIG. 6 with a time-frequency rasterization for the purpose of ascertaining directions and/or angles of the object.
Figure 7:
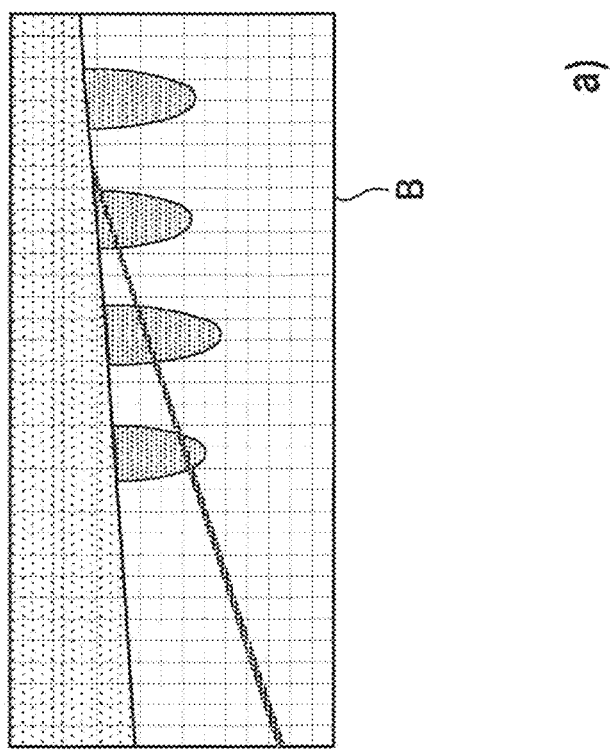

FIG. 7 shows the region B of FIG. 6 in a non-rasterized form in an image a) and a time-frequency rasterization of region B is shown in an image b); in this case, a frequency bin is illustrated horizontally across all measuring cycles, and all frequency bins for an individual measuring cycle are illustrated vertically. A square field B1, B2, B3, B4 of the time-frequency rasterization corresponds to a frequency bin in the discrete domain or a defined frequency internal in the analog domain.

No analysis is performed in frequency bins B1 because only stationary objects in relation to radar device 10, 30 are essentially to be expected there (or it may be expected that the receiving power of the stationary objects dominates).

In frequency bins B2, the received powers are correlated in such a way that an object under an angle results therefrom, the object in the form of a pedestrian being located relative to radar device 10, 30.

In frequency bins B3, the received powers are correlated in such a way that an object under an angle results therefrom, object 200 in the form of a vehicle being located relative to radar devices 10, 30.

In frequency bins B4, no object 200 is able to be detected because of a correlation of received signals.

In addition, it should be taken into account in this analysis that a pedestrian, by definition, has a stationary part (the standing foot) and that the power maximum is provided by the torso. Thus, there is no gap (without signal power) between the Doppler frequency that belongs to the negative ego velocity and the micro-Doppler spread of the pedestrian. Accordingly, it also speaks against the classification of an object as a pedestrian if the spectral maximum is at a significant distance from this Doppler frequency associated with the negative ego velocity.

The present method is advantageously able to be implemented in the form of a software that is running on radar devices 10, 30 and on processing unit 20, which thereby facilitates an uncomplicated variability of the method.

In an advantageous manner, there is no need to take an effect of raindrops into account in the provided system because the power reflected at raindrops actually often overlaps with the micro-Doppler effect of a pedestrian. Because this involves a spatially distributed event, however, it has become apparent that despite the sometimes quite significant power, it is often impossible to determine an angle of incidence. As a result, rain only effectively reduces the signal-to-noise ratio, and a total width of the power spread of the pedestrian in particular is able to be determined without disturbance.

What is claimed is:

1. A detection system for detecting moving objects, comprising:
    a radar system, wherein:
        the detection system is configured to operate the radar system to emit Frequency Modulated Continuous Wave (FMCW) signals and to operate the radar system to emit Continuous Wave (CW) signals;
        the radar system is configured to receive reflection signals as reflections, by the objects under at least one angle, of the emitted FMCW and CW signals; and
    a processing unit, wherein the processing unit is configured to:
        ascertain:
            respective distances and at least one first relative velocity for each of the objects based on those of the reflection signals that are reflections of the FMCW signals, the objects being distinguished from one another with respect to the ascertained respective distances and first relative velocities; and
            at least one second relative velocity for the each of the objects based on those of the reflection signals that are reflections of the CW signals;
        based on the ascertainment, correlate the respective ones of the second relative velocities to respective ones of the ascertained respective distances and first relative velocities, to thereby assign different ones of the second relative velocities to respective ones of the objects; and
    perform a micro-Doppler analysis based on the second relative velocities ascertained from the reflection signals that are reflections of the CW signals wherein respective types of the objects are ascertainable with the micro-Doppler analysis performed separately for different ones of the objects according to the assignments of the different ones of the second relative velocities to the respective ones of the objects.

2. The detection system of claim 1, wherein the ascertained angles are used for a simultaneous micro-Doppler analysis of the objects, where the objects have overlapping distributions of relative velocities.

3. The detection system of claim 1, wherein a width of a frequency spread and a time characteristic of the frequency spread of the received reflection signals are ascertainable with processing unit.

4. The detection system of claim 3, wherein a periodicity of a spread of Doppler frequencies is ascertained with the processing unit.

5. The detection system of claim 1, wherein a limitation of the angle estimate to a defined, small frequency/velocity range is carried out.

6. The detection system of claim 1, wherein the radar system includes a first radar device configured to emit the CW signals and a second radar device configured to emit the FMCW signals.

7. The detection system of claim 1, wherein:
the processing unit is configured to ascertain at least one angle, respectively for each of the ascertained relative velocities, between the radar system and the objects; and
the correlation is performed based on the ascertained angles.

8. The detection system of claim 1, wherein the processing unit is configured to ascertain the respective types of the objects by ascertaining a periodicity of spreads of the second relative velocities.

9. The detection system of claim 1, wherein the radar system includes a single radar device that is intermittently operated by the detection system in a first mode in which the radar device emits the FMCW signals and in a second mode in which the radar device emits the CW signals.

10. The detection system of claim 6, wherein the radar devices have at least one transmission antenna and at least two receiving antennas in each case, and received signals from different receiving directions are receivable with the receiving antennas.

11. The detection system of claim 9, wherein each of the operations of the radar device in the second mode lasts for a period of time that is 10-30 ms.

12. A method for detecting moving objects, the method comprising:
emitting, by a radar system, Frequency Modulated Continuous Wave (FMCW) signals and Continuous Wave (CW) signals;
receiving reflection signals as reflections, by the objects under at least one angle, of the emitted FMCW and CW signals;
ascertaining:
respective distances and at least one first relative velocity for each of the objects based on those of the reflection signals that are reflections of the FMCW signals, the objects being distinguished from one another with respect to the ascertained respective distances and first relative velocities; and
at least one second relative velocity for the each of the objects based on those of the reflection signals that are reflections of the CW signals;
based on the ascertainment, correlating the respective ones of the second relative velocities to respective ones of the ascertained respective distances and first relative velocities, to thereby assign different ones of the second relative velocities to respective ones of the objects;
performing a micro-Doppler analysis based on the second relative velocities ascertained from the reflection signal that are reflections of the CW signals; and
ascertaining respective types of the objects with the micro-Doppler analysis performed separately for different ones of the objects according to the assignments of the different ones of the second relative velocities to the respective ones of the objects.

13. A non-transitory computer readable medium on which are stored program code that is executable by a processor, and that, when executed by the processor, causes the processor to perform a method for detecting moving objects, the method comprising:
operating a radar system to:
emit Frequency Modulated Continuous Wave (FMCW) signals and Continuous Wave (CW) signals; and
receive reflection signals as reflections, by the objects under at least one angle, of the emitted FMCW and CW signals;
ascertaining:
respective distances and at least one first relative velocity for each of the objects based on those of the reflection signals that are reflections of the FMCW signals, the objects being distinguished from one another with respect to the ascertained respective distances and first relative velocities; and
at least one second relative velocity for the each of the objects based on those of the reflection signals that are reflections of the CW signals;
based on the ascertainment, correlating the respective ones of the second relative velocities to respective ones of the ascertained respective distances and first relative velocities, to thereby assign different ones of the second relative velocities to respective ones of the objects;
performing a micro-Doppler analysis based on the second relative velocities ascertained from the reflection signal that are reflections of the CW signals; and
ascertaining respective types of the objects with the micro-Doppler analysis performed separately for different ones of the objects according to the assignments of the different ones of the second relative velocities to the respective ones of the objects.

\* \* \* \* \*